US011326773B2

(12) United States Patent
Huang

(10) Patent No.: US 11,326,773 B2
(45) Date of Patent: May 10, 2022

(54) WASTE HEAT RECOVERY BOILER IN PRODUCING GLASS BEADS

(71) Applicant: Shang-Yong Huang, Langfang (CN)

(72) Inventor: Shang-Yong Huang, Langfang (CN)

( * ) Notice: Subject to any disclaimer, the term of this patent is extended or adjusted under 35 U.S.C. 154(b) by 172 days.

(21) Appl. No.: 16/133,731

(22) Filed: Sep. 18, 2018

(65) Prior Publication Data

US 2019/0093878 A1  Mar. 28, 2019

(30) Foreign Application Priority Data

Sep. 22, 2017 (CN) .......................... 201721223632.X

(51) Int. Cl.
| | | |
|---|---|---|
| *F22B 1/18* | (2006.01) | |
| *F27D 17/00* | (2006.01) | |
| *F22B 21/02* | (2006.01) | |
| *F23M 5/08* | (2006.01) | |
| *F22B 21/06* | (2006.01) | |
| *F23C 6/04* | (2006.01) | |
| *F22B 21/00* | (2006.01) | |
| *C03B 19/10* | (2006.01) | |

(52) U.S. Cl.
CPC .......... *F22B 1/1869* (2013.01); *F22B 21/002* (2013.01); *F22B 21/02* (2013.01); *F22B 21/06* (2013.01); *F23C 6/04* (2013.01); *F23M 5/08* (2013.01); *F27D 17/002* (2013.01); *C03B 19/10* (2013.01); *C03B 19/109* (2013.01); *F27D 2017/006* (2013.01); *Y02P 10/25* (2015.11)

(58) Field of Classification Search
CPC ..................................................... F22B 1/1869
See application file for complete search history.

(56) References Cited

U.S. PATENT DOCUMENTS 2,619,776 A * 12/1952 Potters ................ C03B 19/1025
65/21.3
2,838,881 A * 6/1958 Plumat ................ C03B 19/1025
65/142

(Continued)

FOREIGN PATENT DOCUMENTS

CN          102167498 A  *  8/2011

OTHER PUBLICATIONS

CN102167498A—machine translation (Year: 2011).*

*Primary Examiner* — Nathaniel Herzfeld
(74) *Attorney, Agent, or Firm* — Bayramoglu Law Offices LLC

(57) ABSTRACT

A waste heat recovery boiler in producing glass beads includes an equipment base arranged at the lower part of the waste heat recovery boiler. The upper part of the equipment base is connected with a cylindrical combustion production chamber, the lower part of the combustion production chamber is provided with a raw material inlet with single-layer or staggered layers. A finished product outlet is arranged at the lower end inside the combustion diffusion chamber, a membrane wall is arranged outside the combustion diffusion chamber, a steam-water lead-out straight tube system is symmetrically arranged at the upper end of the combustion diffusion chamber, a top annular water collecting tank is connected between the steam-water lead-out straight tube system and a steam-water lead-out tube system, and the steam-water lead-out tube system is connected with an upper drum.

20 Claims, 3 Drawing Sheets

(56) References Cited

U.S. PATENT DOCUMENTS 3,151,965 A * 10/1964 Patterson ............ C03B 19/1025
65/21.3
3,190,737 A *  6/1965 Schmidt ............. C03B 19/1025
65/21.3
4,046,548 A *  9/1977 Wood ................ C03B 19/1025
65/142

* cited by examiner

WASTE HEAT RECOVERY BOILER IN PRODUCING GLASS BEADS

CROSS REFERENCE TO RELATED APPLICATIONS

This application is based is based upon and claims priority to Chinese Application Number 201721223632.X filed on Sep. 22, 2017, which is incorporated herein by reference in its entirety.

TECHNICAL FIELD

The present invention belongs to the technical field of boiler machinery, in particular to a waste heat recovery boiler in producing glass beads.

BACKGROUND

Boiler is a kind of energy conversion equipment, the energy input to the boiler is the chemical energy in fuel and electric energy, boiler outputs steam with certain thermal energy, high-temperature water or organic heat carrier; pot refers to a water container for heating on the fire, whereas furnace refers to the place for fuel combustion, and a boiler includes the two parts of boiler and furnace; the hot water or steam produced in the boiler can directly provide the thermal energy required for industrial production and daily life, and it also can be converted into mechanical energy by a steam power device, or the by a generator mechanical energy is then converted to electrical energy by a generator. The boiler that provides hot water is called as a hot water boiler, and it is mainly used for mainly for daily life and also applied in industrial production sometimes, the boiler that produces steam is called as a steam boiler, which is often referred to as boiler, and it is mostly used for thermal power station, ships, locomotives and industrial and mining enterprises. In cold winter, boiler heating is an important means, the existing boilers usually burn coal, the using cost of boilers are gradually increasing as the decrease of the coal resources, and it is the key for the existing boiler equipment technology to improve the utilization rate of coal fuels. However, the existing boilers increase the utilization ratio of coal fuels and then improve the economic benefit just by the full combustion of coal, but it has little effect on energy saving. In addition, when a boiler is burning, the carbon monoxide and sulfur dioxide produced by burning the coal fuels will be exhausted into the atmosphere together with smoke from the exhaust pipe, which will result in a bad effect on the air. Therefore, we propose an energy-saving and environment-friendly boiler.

High-temperature steam is often used for steaming food in daily life or heating in winter or in industry. In the existing steam generator, the flame generated by burning gas enters the steam generator and rises all the way, the thermal energy is transferred to the baffle, the baffle then transfers the thermal energy to the water in the steam generator, the water is heated to gradually boils for many times and generate water vapor, and then the saturated water vapor is exported for steaming food or for other uses. The existing steam generators have the following disadvantages: 1. Since the finally exhausted flue gas has higher temperature and will take away a large amount of thermal energy, the thermal energy has low utilization efficiency; 2. Due to the low utilization efficiency of thermal energy, the steam temperature sometimes can't meet the requirement for 100° C., and thus it is slower to produce steam, which is inconvenient for many occasions requiring for producing steam quickly.

In the industrial production of glass beads, the high temperature exhaust gas produced by the sintering boiler for glass beads is often directly lost and exhausted, and the heat produced by the high-temperature exhaust gas can't be reutilized. How to reutilize the heat produced in the production of glass beads is a problem to be solved in the technical field of boilers, and higher requirements are put forward for the materials used for boilers.

SUMMARY

Aiming at the disadvantages in the prior art, the present invention aims to provide a waste heat recovery boiler in producing glass beads.

In order to achieve the above purpose, the present invention adopts the technical scheme that:

A waste heat recovery boiler in producing glass beads, characterized in that: an equipment base is arranged at the lower part of the waste heat recovery boiler, the upper part of the equipment base is connected with a cylindrical combustion production chamber, the lower part of the combustion production chamber is provided with a single-layer or staggered raw material inlet, portholes are symmetrically arranged on both sides of a combustion diffusion chamber and above the single-layer or staggered raw material inlet, the upper end of the combustion production chamber is connected with the combustion diffusion chamber, and the cylinder wall tube of the combustion production chamber is connected with the cylinder wall tube of the combustion diffusion chamber through a steel tube. A finished product outlet is arranged at the lower end inside the combustion diffusion chamber, a membrane wall is arranged outside the combustion diffusion chamber, a steam-water lead-out straight tube system is symmetrically arranged at the upper end of the combustion diffusion chamber, a top annular water collecting tank is connected between the steam-water lead-out straight tube system and a steam-water lead-out tube system, the steam-water lead-out tube system is connected with an upper drum, and the boiler walls of the combustion diffusion chamber and the combustion production chamber are formed up by heat-resisting steel tubes and steel plates. A fixing bracket is additionally arranged on both sides of the combustion production chamber and the combustion diffusion chamber.

The boiler wall of the combustion production chamber is a longitudinal square tubular structure by welding steel plates with steel plates, and square tubes are connected with square tubes into the combustion production chamber in a cylindrical structure; side descending tubes leading from the lower end of the upper drum are symmetrically arranged outside the combustion production chamber, the side descending tubes are connected with a I# side descending distribution tube I, a I# side descending distribution tube II, a I# side descending distribution tube III, a I# middle descending distribution tube I, a I# middle descending distribution tube II, a I# middle descending distribution tube III and a I# middle descending tube, a lower water collecting tank is arranged at the lower end of the drum wall of the combustion production chamber, the distribution tubes are connected with the lower water collecting tank, and the square tube of the drum wall is connected with the lower water collecting tank; the side descending tubes play a role in supplementing the water in the upper drum into the boiler wall tube of the combustion production chamber.

The drum wall of the combustion diffusion chamber is a steel plate, the steel plate is connected with the steel tube into the cylindrical combustion diffusion chamber, the descending tubes are arranged outside the drum wall, the descending tubes are connected with the distribution tubes, the lower water collecting tank is arranged at the lower end of the boiler wall of the combustion diffusion chamber, and the distribution tubes are connected with the lower water collecting tank; the steel tube of the boiler wall of the combustion diffusion chamber is connected with the lower water collecting tank; the descending tubes play a role in supplementing the water in the upper drum into the steel tube of the boiler wall of the combustion diffusion chamber.

DETAILED DESCRIPTION OF THE EMBODIMENTS

Embodiment 1

Figure 1:
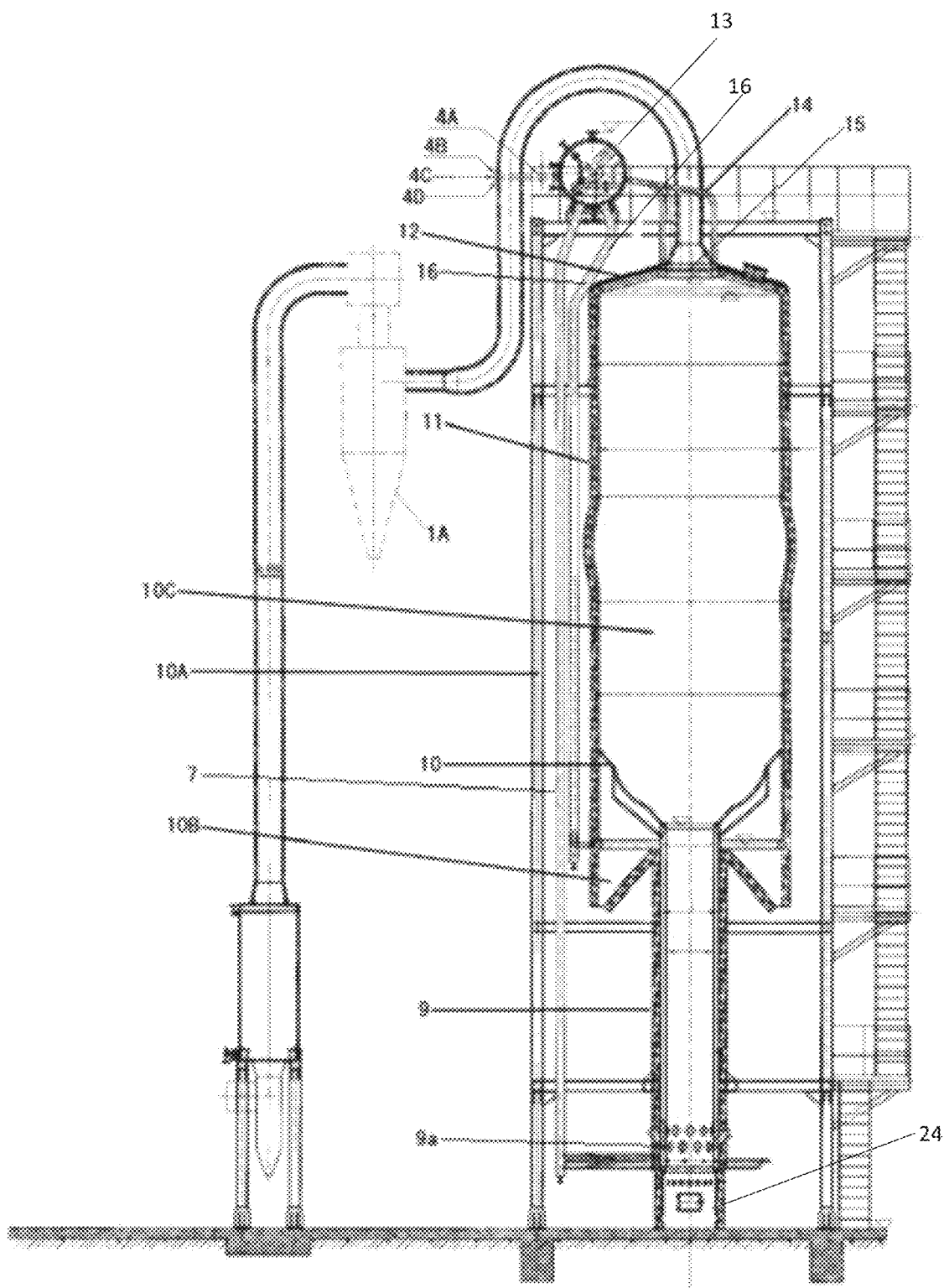
FIG. 1 is a diagram showing the overall structure of the present invention.
Figure 2:
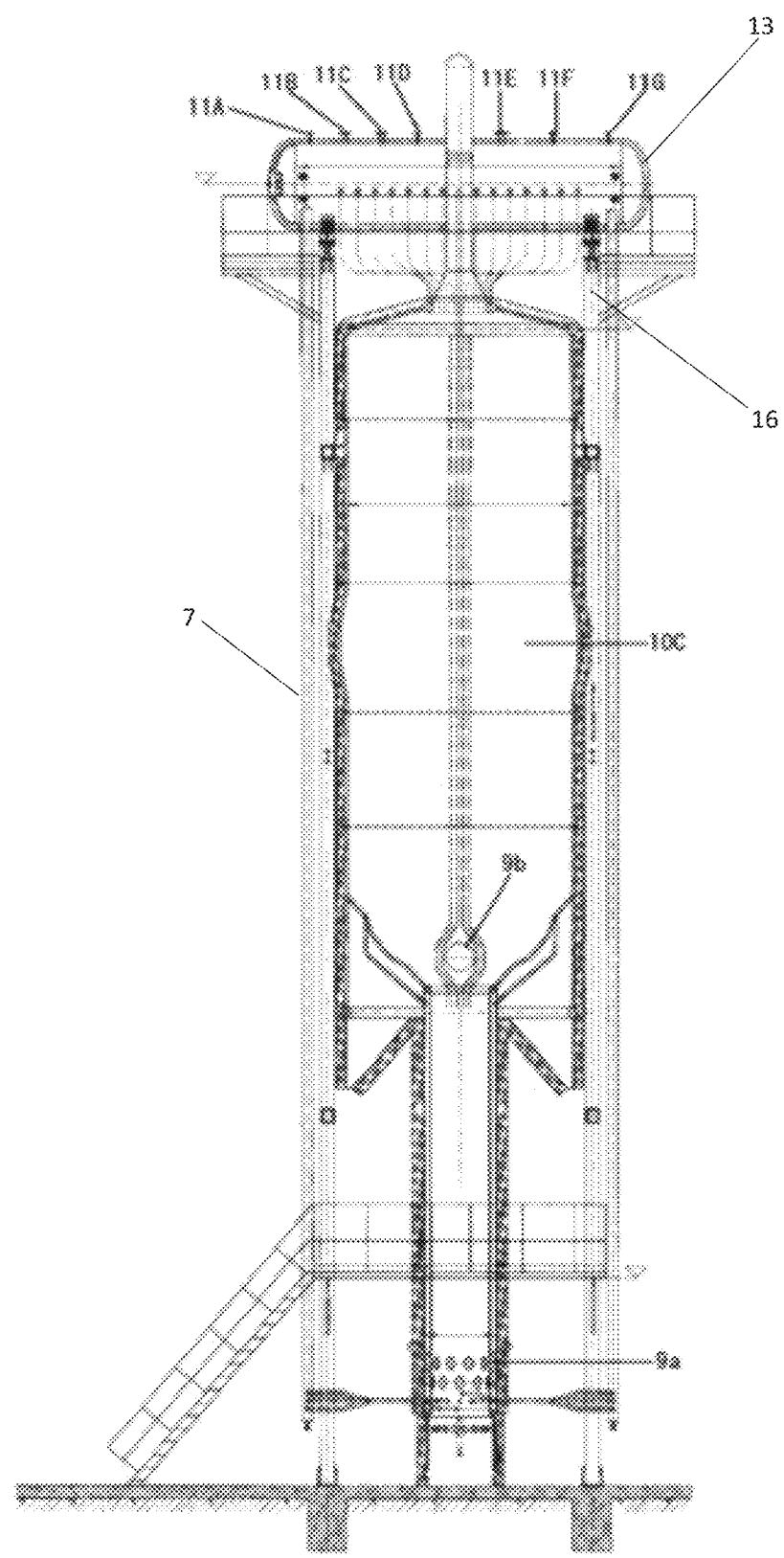
FIG. 2 is a side view of FIG. 1.
Figure 3:
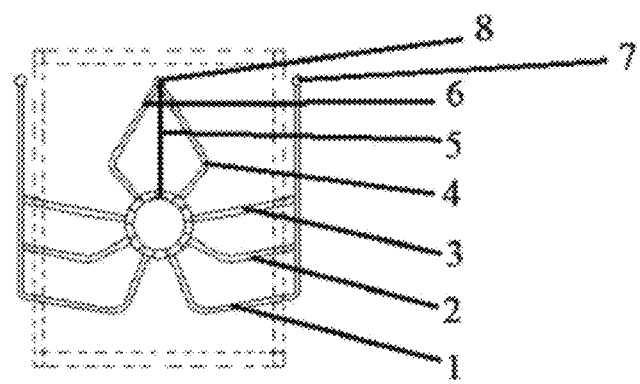
FIG. 3 is a structural diagram showing the cross section of the boiler wall of the combustion production chamber (9) for glass bead product in the present invention.
Figure 4:
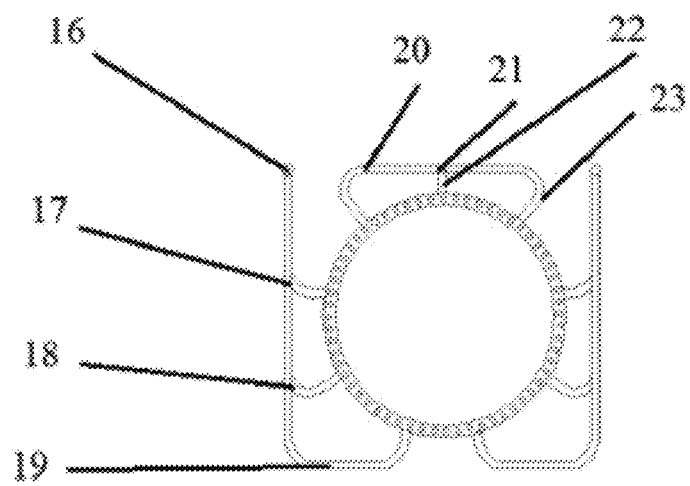
FIG. 4 is a structural diagram showing the cross section of the boiler wall of the combustion diffusion chamber (10C) for glass bead product in the present invention;
4A is the central line of the upper drum; 4B is the highest safe water level; 4C is the normal water level; 4D is the lowest safe water level; 1A is the dust remover; 11A is the first pressure gauge seat DN20; 11B is the safety valve seat DN50; 11C is the safety valve seat DN80; 11D is the exhaust valve seat DN20; 11E is the main steam tube seat DN100; 11F is the auxiliary steam tube seat DN40; 11G is the second pressure gauge seat DN20; 10A is the manhole; 10A is the dust remover; 10A is the fixing bracket; 10C is the combustion diffusion chamber; 10B is the finished product outlet.

A waste heat recovery boiler in producing glass beads, an equipment base is arranged at the lower part of the waste heat recovery boiler, the upper part of the equipment base is connected with a cylindrical combustion production chamber (9), the lower part of the combustion production chamber (9) is provided with a single-layer or staggered raw material inlet (9a), portholes (9b) are symmetrically arranged on both sides of a combustion diffusion chamber (10) and above the single-layer or staggered raw material inlet (9a), the upper end of the combustion production chamber (9) is connected with the combustion diffusion chamber (10C), and the cylinder wall tube of the combustion production chamber (9) is connected with the cylinder wall tube of the combustion diffusion chamber (10C) through a steel tube (10). A finished product outlet (10B) is arranged at the lower end inside the combustion diffusion chamber (10C), a membrane wall (11) is arranged outside the combustion diffusion chamber (10C), a steam-water lead-out straight tube system (12) is symmetrically arranged at the upper end of the combustion diffusion chamber (10C), a top annular water collecting tank (15) is connected between the steam-water lead-out straight tube system (12) and a steam-water lead-out tube system (14), and the steam-water lead-out tube system (14) is connected with an upper drum (13). The boiler walls of the combustion diffusion chamber (10C) and the combustion production chamber (9) are formed up by heat-resisting steel tubes and steel plates. Descending tubes (7)(16) leading from the upper drum are arranged on both sides of the combustion production chamber (9) and the combustion diffusion chamber (10C). A fixing bracket (10A) is additionally arranged on both sides of the combustion production chamber (9) and the combustion diffusion chamber (10C).

The boiler wall of the combustion production chamber (9) is a longitudinal square tubular structure by welding steel plates with steel plates, and square tubes are connected with square tubes into the combustion production chamber (9) in a cylindrical structure; side descending tubes (7) leading from the lower end of the drum are symmetrically arranged outside the combustion production chamber (9), the side descending tubes (7) are connected with a side descending distribution tube I (1), a side descending distribution tube II (2), a side descending distribution tube III (3), a middle descending distribution tube I (4), a middle descending distribution tube II (5), a middle descending distribution tube III (6) and a middle descending tube (8), a lower water collecting tank (24) is arranged at the lower end of the drum wall of the combustion production chamber (9), the distribution tubes are connected with the lower water collecting tank (24), and the square tube of the drum wall is connected with the lower water collecting tank (24); the side descending tubes (7) play a role in supplementing the water in the upper drum into the boiler wall tube of the combustion production chamber (9).

The drum wall of the combustion diffusion chamber (10C) is a steel plate, the steel plate is connected with the steel tube into the cylindrical combustion diffusion chamber (10C), the descending tubes are arranged outside the drum wall, the descending tubes (16) are connected with the distribution tubes (17, 18, 19, 20, 21, 22, 23), the lower water collecting tank (24) is arranged at the lower end of the boiler wall of the combustion diffusion chamber (10C), and the distribution tubes are connected with the lower water collecting tank (24); the steel tube of the boiler wall of the combustion diffusion chamber (10C) is connected with the lower water collecting tank (24); the descending tubes (16) play a role in supplementing the water in the upper drum into the steel tube of the boiler wall of the combustion diffusion chamber (10C).

Finally, it shall be stated that, obviously, the above embodiments are just the examples for clearly describing this application but are not limitations for the modes of execution. For the common technicians of this field, other different forms of changes or variations can also be obtained on the basis of the above descriptions. Taking the changes in the materials of drum body, changes in the distribution of descending tubes, etc. as examples, it is unnecessary and also unable to list all the modes of execution. However, the obvious changes or variations induced from them are all within the protective range of this application.

What is claimed is:
1. A waste heat recovery boiler used in the process of producing glass beads comprising: an equipment base arranged at a lower part of the waste heat recovery boiler, wherein
an upper part of the equipment base is connected with a cylindrical combustion production chamber;
a lower part of the cylindrical combustion production chamber is provided with a raw material inlet with a single-layer or staggered layers;

an upper end of the cylindrical combustion production chamber is connected with a combustion diffusion chamber;

a cylinder wall tube of the cylindrical combustion production chamber is connected with a cylinder wall tube of the combustion diffusion chamber through a steel tube;

a steam-water lead-out straight tube system is symmetrically arranged at an upper end of the combustion diffusion chamber;

a top annular water collecting tank is connected between the steam-water lead-out straight tube system and a steam-water lead-out tube system;

boiler walls of the combustion diffusion chamber and the cylindrical combustion production chamber are formed by heat-resisting steel tubes and steel plates; and a fixing bracket is arranged on both sides of the cylindrical combustion production chamber and the combustion diffusion chamber.

2. The waste heat recovery boiler used in the process of producing glass beads according to claim 1, wherein the boiler wall of the cylindrical combustion production chamber is a longitudinal square tubular structure;

square tubes are connected with each other to form the cylindrical combustion production chamber having a cylindrical structure;

side descending tubes leading from a lower end of an upper drum are symmetrically arranged outside the cylindrical combustion production chamber;

a lower water collecting tank is arranged at a lower end of a drum wall of the cylindrical combustion production chamber;

a plurality of distribution tubes is connected with the lower water collecting tank.

3. The waste heat recovery boiler used in the process of producing glass beads according to claim 1, wherein a drum wall of the combustion diffusion chamber is a steel plate;

a plurality of descending tubes is arranged outside the drum wall;

the lower water collecting tank is arranged at a lower end of the boiler wall of the combustion diffusion chamber; and the plurality of descending tubes plays a role in supplementing water in an upper drum into the steel tube of the boiler wall of the combustion diffusion chamber.

4. The waste heat recovery boiler used in the process of producing glass beads according to claim 1, wherein a diameter of the cylindrical combustion production chamber is smaller than that of the combustion diffusion chamber;

the cylindrical combustion production chamber is used for burning and melting raw materials;

the combustion diffusion chamber is used for molding glass bead products; and a molded product is outputted from a finished product outlet at a lower end of the combustion diffusion chamber.

5. The waste heat recovery boiler used in the process of producing glass beads according to claim 1, further comprising:

portholes symmetrically arranged on both sides of the combustion diffusion chamber.

6. The waste heat recovery boiler used in the process of producing glass beads according to claim 5, wherein the portholes are located above the raw material inlet with the single layer.

7. The waste heat recovery boiler used in the process of producing glass beads according to claim 5, wherein the portholes are located above the raw material inlet with the staggered layers.

8. The waste heat recovery boiler used in the process of producing glass beads according to claim 1, further comprising:

a finished product outlet is arranged at a lower end inside the combustion diffusion chamber.

9. The waste heat recovery boiler used in the process of producing glass beads according to claim 1, further comprising:

a membrane wall is arranged outside the combustion diffusion chamber.

10. The waste heat recovery boiler used in the process of producing glass beads according to claim 1, wherein the steam-water lead-out tube system is connected with an upper drum.

11. The waste heat recovery boiler used in the process of producing glass beads according to claim 2, wherein the boiler wall of the cylindrical combustion production chamber is formed by welding a plurality of steel plates.

12. The waste heat recovery boiler used in the process of producing glass beads according to claim 2, wherein the side descending tubes are connected with a first side descending distribution tube, a second side descending distribution tube, a third side descending distribution tube, a first middle descending distribution tube, a second middle descending distribution tube, a third middle descending distribution tube and a middle descending tube.

13. The waste heat recovery boiler used in the process of producing glass beads according to claim 2, wherein the square tubes of the drum wall of the cylindrical combustion production chamber are with the lower water collecting tank.

14. The waste heat recovery boiler used in the process of producing glass beads according to claim 2, wherein the side descending tubes supplement water in the upper drum into a boiler wall tube of the cylindrical combustion production chamber.

15. The waste heat recovery boiler used in the process of producing glass beads according to claim 3, wherein the steel plate is connected with a steel tube to form the cylindrical combustion diffusion chamber.

16. The waste heat recovery boiler used in the process of producing glass beads according to claim 3, wherein the plurality of descending tubes is connected with the plurality of distribution tubes.

17. The waste heat recovery boiler used in the process of producing glass beads according to claim 3, wherein the plurality of distribution tubes is connected with the lower water collecting tank.

18. The waste heat recovery boiler used in the process of producing glass beads according to claim 3, wherein the steel tube of the boiler wall of the combustion diffusion chamber is connected with the lower water collecting tank.

19. A waste heat recovery boiler used in the process of producing glass beads comprising: an equipment base arranged at a lower part of the waste heat recovery boiler, wherein an upper part of the equipment base is connected with a cylindrical combustion production chamber;

a lower part of the cylindrical combustion production chamber is provided with a raw material inlet with a single-layer or staggered layers;

portholes are symmetrically arranged on both sides of a combustion diffusion chamber and the portholes are located above the raw material inlet with the single-layer or staggered layers;

an upper end of the cylindrical combustion production chamber is connected with the combustion diffusion chamber;

a cylinder wall tube of the cylindrical combustion production chamber is connected with a cylinder wall tube of the combustion diffusion chamber through a steel tube;

a finished product outlet is arranged at a lower end inside the combustion diffusion chamber;

a membrane wall is arranged outside the combustion diffusion chamber;

a steam-water lead-out straight tube system is symmetrically arranged at an upper end of the combustion diffusion chamber;

a top annular water collecting tank is connected between the steam-water lead-out straight tube system and a steam-water lead-out tube system;

the steam-water lead-out tube system is connected with an upper drum;

boiler walls of the combustion diffusion chamber and the cylindrical combustion production chamber are formed by heat-resisting steel tubes and steel plates; and a fixing bracket is arranged on both sides of the cylindrical combustion production chamber and the combustion diffusion chamber, wherein the boiler wall of the cylindrical combustion production chamber is a longitudinal square tubular structure formed by welding a plurality of steel plates;

square tubes are connected with each other to form the cylindrical combustion production chamber having a cylindrical structure;

side descending tubes leading from a lower end of the upper drum are symmetrically arranged outside the cylindrical combustion production chamber;

the side descending tubes are connected with a first side descending distribution tube, a second side descending distribution tube, a third side descending distribution tube, a first middle descending distribution tube, a second middle descending distribution tube, a third middle descending distribution tube and a middle descending tube;

a lower water collecting tank is arranged at a lower end of a drum wall of the cylindrical combustion production chamber;

a plurality of distribution tubes is connected with the lower water collecting tank;

the square tubes of the drum wall of the cylindrical combustion production chamber are connected with the lower water collecting tank; and the side descending tubes supplement water in the upper drum into a boiler wall tube of the cylindrical combustion production chamber.

20. A waste heat recovery boiler used in the process of producing glass beads comprising: an equipment base arranged at a lower part of the waste heat recovery boiler, wherein an upper part of the equipment base is connected with a cylindrical combustion production chamber;

a lower part of the cylindrical combustion production chamber is provided with a raw material inlet with a single-layer or staggered layers;

portholes are symmetrically arranged on both sides of a combustion diffusion chamber and the portholes are located above the raw material inlet with the single-layer or staggered layers;

an upper end of the cylindrical combustion production chamber is connected with the combustion diffusion chamber;

a cylinder wall tube of the cylindrical combustion production chamber is connected with a cylinder wall tube of the combustion diffusion chamber through a steel tube;

a finished product outlet is arranged at a lower end inside the combustion diffusion chamber;

a membrane wall is arranged outside the combustion diffusion chamber;

a steam-water lead-out straight tube system is symmetrically arranged at an upper end of the combustion diffusion chamber;

a top annular water collecting tank is connected between the steam-water lead-out straight tube system and a steam-water lead-out tube system;

the steam-water lead-out tube system is connected with an upper drum;

boiler walls of the combustion diffusion chamber and the cylindrical combustion production chamber are formed by heat-resisting steel tubes and steel plates; and a fixing bracket is arranged on both sides of the cylindrical combustion production chamber and the combustion diffusion chamber, wherein a drum wall of the combustion diffusion chamber is a steel plate;

the steel plate is connected with a steel tube to form the cylindrical combustion diffusion chamber;

a plurality of descending tubes is arranged outside the drum wall;

the plurality of descending tubes is connected with the plurality of distribution tubes;

a lower water collecting tank is arranged at a lower end of the boiler wall of the combustion diffusion chamber;

the plurality of distribution tubes is connected with the lower water collecting tank;

the steel tube of the boiler wall of the combustion diffusion chamber is connected with the lower water collecting tank; and the plurality of descending tubes plays a role in supplementing water in the upper drum into the steel tube of the boiler wall of the combustion diffusion chamber.

* * * * *